United States Patent [19]
Naito et al.

[11] Patent Number: 5,382,994
[45] Date of Patent: Jan. 17, 1995

[54] CAMERA INFORMATION TRANSMISSION SYSTEM INCLUDING BODY, LENS, AND ADAPTER COMPONENTS

[75] Inventors: Hideshi Naito, Tokyo; Yoshiharu Shiokama, Chiba; Shinichi Ushio, Yokohama, all of Japan

[73] Assignee: Nikon Corporation, Tokyo, Japan

[21] Appl. No.: 226,119

[22] Filed: Apr. 11, 1994

Related U.S. Application Data

[63] Continuation of Ser. No. 840,520, Feb. 25, 1992, abandoned.

[30] Foreign Application Priority Data

Mar. 6, 1991 [JP] Japan .................. 3-039870

[51] Int. Cl.⁶ ................................. G03B 7/20
[52] U.S. Cl. ................................. 354/286
[58] Field of Search ............... 354/286, 400, 402

[56] References Cited

U.S. PATENT DOCUMENTS

| | | | |
|---|---|---|---|
| 4,758,854 | 7/1988 | Saegusa | 354/286 |
| 4,881,094 | 11/1989 | Terui et al. | 354/286 |
| 4,912,494 | 3/1990 | Tanaka et al. | 354/286 X |
| 4,935,760 | 6/1990 | Kojima | 354/286 |
| 4,963,910 | 10/1990 | Ishimura | 354/400 |
| 5,038,163 | 8/1991 | Hirasawa | 354/400 |
| 5,053,798 | 10/1991 | Ohara et al. | 354/286 X |

FOREIGN PATENT DOCUMENTS 1-137241 5/1989 Japan.

*Primary Examiner*—Michael L. Gellner
*Assistant Examiner*—J. K. Han
*Attorney, Agent, or Firm*—Shapiro and Shapiro

[57] ABSTRACT

A camera system is provided in which the entire performance is not deteriorated by corrective calculations for adapters, in information transmission between an interchangeable lens and an adapter. The adapter is equipped with an information processing device, capable of correcting at least a part of an information transmitted from the information processing device of the interchangeable lens, based on information specific to the adapter, and transmitting thus corrected information to the information processing device of the interchangeable lens.

6 Claims, 3 Drawing Sheets

CAMERA INFORMATION TRANSMISSION SYSTEM INCLUDING BODY, LENS, AND ADAPTER COMPONENTS

This is a continuation of application Ser. No. 07/840,520 filed Feb. 25, 1992, now abandoned.

BACKGROUND OF THE INVENTION

1. Field of the Invention

The present invention relates to transmission of information between an interchangeable lens for a camera and an adapter therefor.

2. Related Background Art

There is already known a system for mutual information transmission by mechanical or electrical manner between the camera body and the interchangeable lens. In such system, for example, the information on F-number of the interchangeable lens is transmitted from lens to the camera body, and, to an interchangeable lens capable of driving the diaphragm or the focusing lens by an incorporated motor, the driving information therefor is transmitted from the camera body.

In such interchangeable lens system, in case an adapter such as intermediate ring or a rear-focus converter is mounted, a part of the information transmitted between the camera body and the lens has to be corrected according to the optical characteristics of such adapter. For such correction there have already been proposed various methods, which have respective advantages and disadvantages. Also, in the commonly assigned Japanese Patent. Laid-open Application No. 1-137241, a system free from the drawbacks of the conventional systems is proposed. In brief, this proposal is to at first effect communication between the interchangeable lens and the adapter to fetch the correction data of said adapter into the lens, then to effect direct communication between the camera body and the lens for various controls, and to effect necessary corrections on the transmitted data on the lens side.

Also the U.S. Pat. No. 4,912,494 discloses a system in which the interchangeable lens is provided with a signal processing unit, which identifies the mounting of an auxiliary phototaking means such as an adapter and effects communication with a signal processing unit in the camera body.

As explained in the foregoing, the data correction in the conventional technology is conducted in the interchangeable lens side. However, there are recently commercialized interchangeable lenses incorporating a motor for automatic focusing and provided with various additional functions, such as a go-home function for driving the lens to a pre-memorized position or a range limiting function for limiting the driving range of the lens. In such interchangeable lenses, the CPU thereof has considerable load for various controls, and the addition of corrective calculations for the adapters will create excessive loads, thus significantly deteriorating the functions of the entire system.

SUMMARY OF THE INVENTION

In consideration of the foregoing, an object of the present invention is to provide a camera system which does not deteriorate the entire function in the corrective calculations for adapters, in the information transmission between the interchangeable lens and the adapters.

The above-mentioned object can be attained, according to the present invention, by a camera system incorporating an adapter 3 in a system of a camera and an interchangeable lens, wherein the data of the interchangeable lens 2 are transmitted to the adapter 3, which in response effects corrective calculation based on the information specific to the adapter and transmits the corrected data to the interchangeable lens 2. The corrected data are received by and stored in the interchangeable lens 2, and the information transmission between the camera body 1 and the interchangeable lens 2 is conducted, based on said data after correction.

In the camera system of the present invention, since the calculation of correction for the data of the interchangeable lens is conducted by a CPU in the adapter when it is mounted on the interchangeable lens, the load on the CPU of the interchangeable lens is scarcely increased.

DESCRIPTION OF THE PREFERRED EMBODIMENTS

Figure 1:
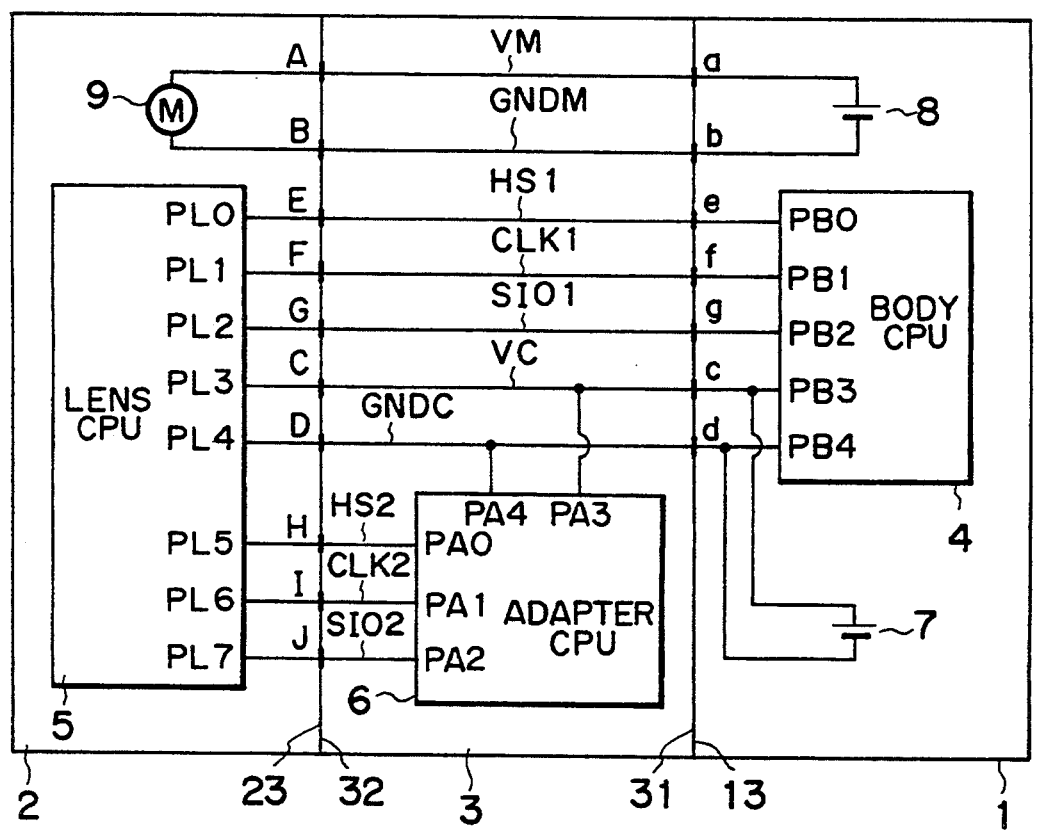
FIG. 1 is a block diagram of a camera system embodying the present invention.

Now the present invention will be clarified in detail by an embodiment thereof. FIG. 1 is a schematic view of the camera system of the present embodiment, wherein a camera body 1, a lens 2, and an adapter 3 are respectively provided with a body CPU 4, a lens CPU 5 and an adapter CPU 6. There are also shown a mount face 23 of the lens 2, a lens side mount face 32 of the adapter 3, a body side mount face 31 of the adapter 3, and a mount face 13 of the body 1. The CPU's 4, 5, and 6 constitute first, second, and third information processing means, respectively.

The camera body 1 is provided therein with a power source 7 for the body CPU 4, lens CPU 5 and adapter CPU 6, and a power supply line VC and a ground line GNDC of said power source are connected to the terminals PB3, PB4 of the body CPU 4, also to the terminals PA3, PA4 of the adapter CPU 6 through mount terminals c, d, between the body and the adapter, and to the terminals PL3, PL4 of the lens CPU 5 through mount terminals C, D between the lens and the adapter.

The body 1 also incorporates a power source 8 for the drive sources in the lens (diaphragm driving motor, focusing lens driving motor, zoom lens driving motor etc.), and a power supply line VM and a ground line GNDM are connected to the drive sources 9 in the lens 2, through mount contacts a, b between the body and the adapter, and through mount contacts A, B between the lens and the adapter.

The body CPU 4 and the lens CPU 5 are directly connected by a handshake line HS1, a clock line CLK1, a data line SIO1 (first information transmitting means), through mount contacts e, f, g between the body and the adapter, the interior of the adapter, and mount contacts E, F, G between the lens and the adapter. The communication between the body CPU4 and the lens CPU 5 is conducted by clock synchronized data communication utilizing clock signal CLK1.

Also the lens CPU 5 and the adapter CPU 6 are directly connected by a handshake line HS2, a clock line CLK2, and a data line SIO2 (second information transmitting means), through mount contacts H, I, J between the lens and the adapter. The communication between the lens CPU 5 and the adapter CPU 6 is conducted by clock synchronized data communication utilizing clock signal CLK2.

Figure 2:
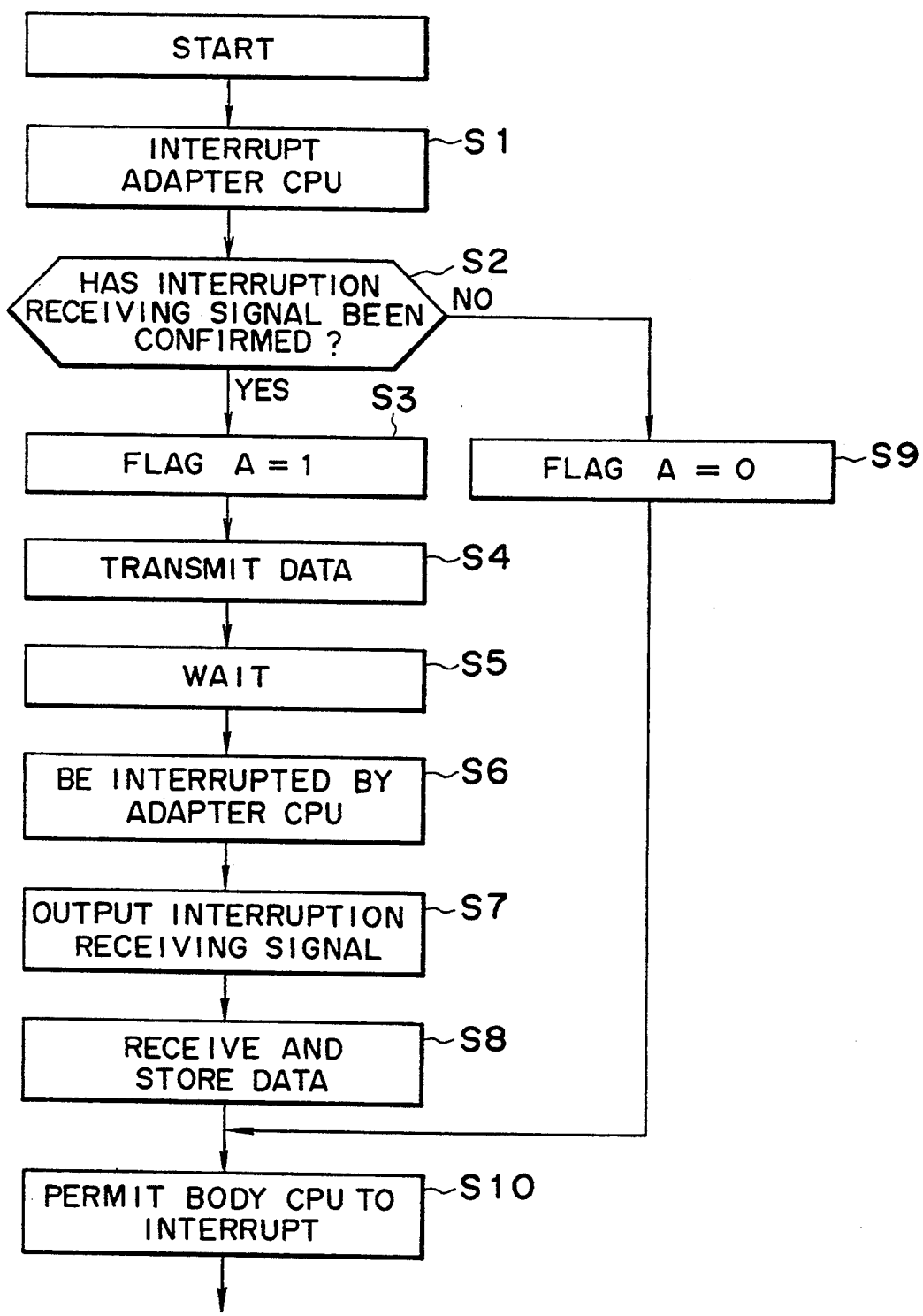
FIG. 2 is a flow chart of the control sequence of a lens CPU.

In the following there will be explained the function of the present embodiment, with reference to flow charts showing the control sequences of the lens CPU 5 and of the adapter CPU 6, respectively shown in FIGS. 2 and 3.

When the lens 2 is mounted on the body 1 or on the adapter 3 and the terminals PL3, PL4 are connected to the power supply line VC and the ground line GNDC, the lens CPU 5 is powered and reset, whereby the present sequence is initiated.

In a step S1, the lens CPU 5 switches the handshake line HS2 to an output port and generates an interruption pulse, thereby interrupting the adapter CPU 6.

When the adapter 3 is not mounted, namely when the lens 2 is directly mounted on the body 1, the lens mount terminal H of the handshake line HS2 is left open, so that no response is obtained to this interruption.

When the adapter 3 is mounted, said interruption pulse is supplied to a port PA0 of the adapter CPU 6, through the lens-adapter mount terminal H.

Figure 3:
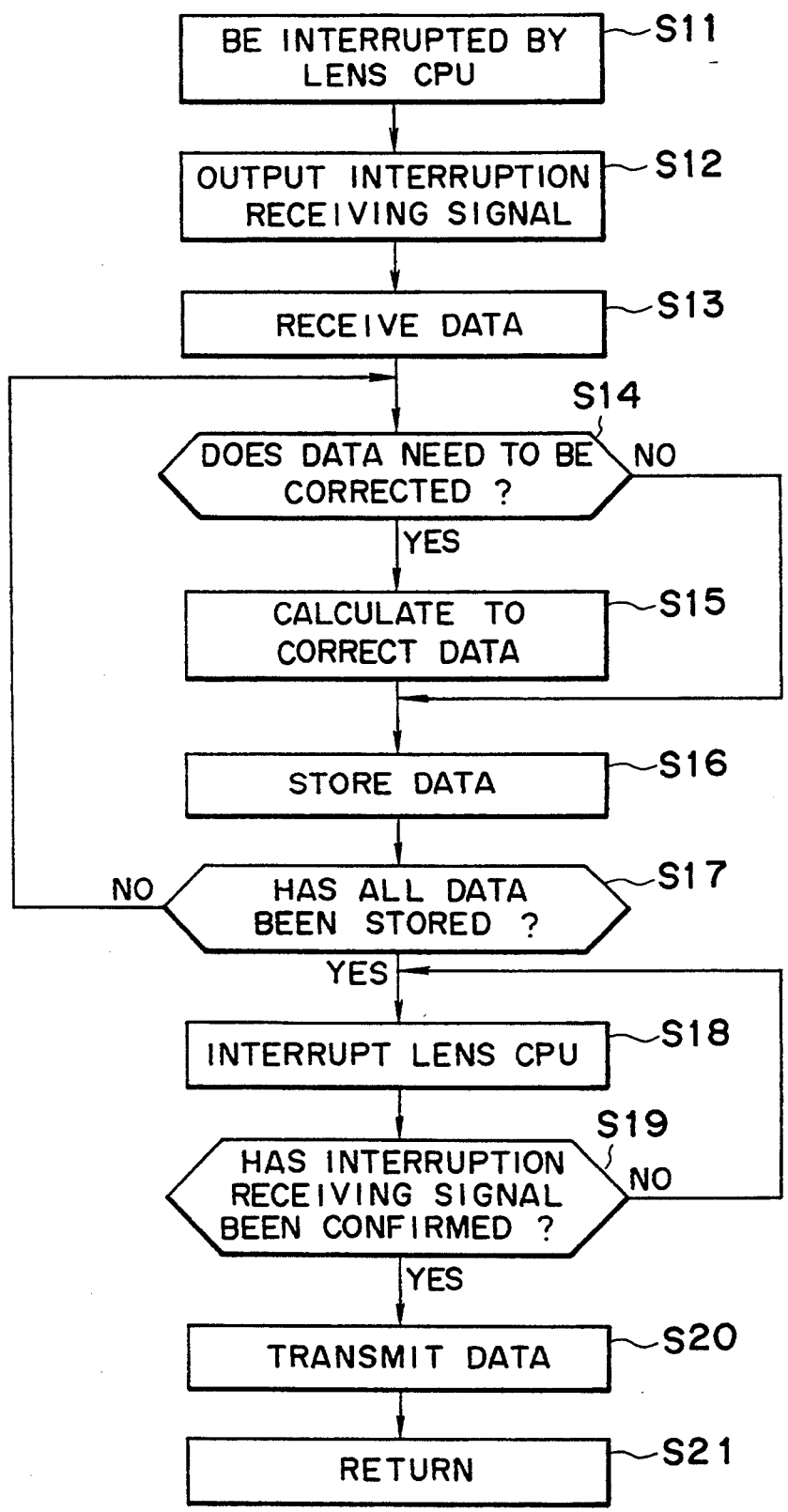
FIG. 3 is a flow chart of the control sequence of an adapter CPU.

Upon receiving the interruption pulse at the port PA0, the adapter CPU 6 activates the lens CPU interruption sequence in a step S11 shown in FIG. 3, then, in a step S12, switches the port PA0 to an output port and generates an interruption reception signal.

After generating the interruption pulse in the step S1, the lens CPU 5 switches the port PL5 to an input port, then discriminates, in a step S2, whether the interruption reception signal is received at the port PL5 from the adapter CPU 6, and, if not, sets a flag FLAGA at "0" in a step S9. Said flag FLAGA indicates that the adapter is mounted or not respectively at "1" or "0". In case FLAGA=0, a step S10 enables interruption from the body CPU 4, whereupon various controls are conducted according to the commands from the body CPU 4.

On the other hand, if the step S2 confirms the interruption reception signal, a step S3 sets the flag FLAGA at "1", and a step S4 effects data transmission from a port PL7 in synchronization with clock pulses transmitted from a port PL6.

In a step S13, the adapter CPU 6 receives clock pulses from the lens CPU at a port PA1, and also receives data at a port PA2 in synchronization with said clock pulses. Then a step S14 discriminates whether said data require correction. If the data do not require correction, the sequence proceeds to a step S16 for storing said data. If the correction is required, steps S15 and S16 are executed to effect correction of the data and storage of the corrected data. Then a step S17 discriminates whether all the received data are stored, and, if not, the sequence returns to the step S14 for repeating a similar sequence. Upon confirmation that all the received data are stored, a step S18 sends an interruption pulse from the port PA0, through the handshake line, to the lens CPU 5.

The lens CPU 5, after the data transmission to the adapter CPU 6, switches the handshake line HS2 to the input port in a step S5 and enters a stand-by state. When the interruption pulse from the adapter CPU 6 is received at the port PL5, a step S7 generates an interruption reception signal at the port PL5.

Upon receiving the interruption reception signal, the adapter CPU 6 generates clock pulses at the port PA0 and transmits the stored data from the port PA2, in synchronization with said clock pulses. After the data transmission, the sequence returns to the main program.

The lens CPU 5, in a step S8, receives the data at a port PL7 in synchronization with said clock pulses, and stores said data in a memory in the lens CPU 5. Subsequently the lens CPU 5 enables, in a step S10, interruption from the body CPU, and then executes various controls according to the commands from the body CPU 4. The information transmission between the lens CPU 5 and the body CPU 4 uses corrected data in case FLAGA=1, namely when the adapter 3 is mounted, or uncorrected data in case FLAGA=0, namely when the adapter is not mounted.

As explained in the foregoing, in the camera system of the present invention, the load of the CPU in the interchangeable lens is scarcely increased since the corrective calculation for the lens data, required by the mounting of the adapter, is conducted by the CPU provided in said adapter, whereby the transmission of information is rendered possible without sacrificing the performance of the entire system.

What is claimed is:

1. A camera system comprising:
a camera body including first information processing means;
a lens barrel including second information processing means and mountable on said camera body;
an adapter including third information processing means and mountable at least on said lens barrel;
first information transmission means provided between said camera body and said lens barrel for connecting said first and second information processing means, and adapted to transmit at least a part of information specific to said lens barrel to said camera body; and
second information transmission means provided between said lens barrel and said adapter for connecting said second and third information processing means;
wherein said third information processing means is constructed to correct at least a part of information, transmitted from said second information processing means through said second information transmission means, based on information specific to said adapter, and to transmit said corrected information to said second information processing means through said second information transmission means.

2. The camera system according to claim 1, wherein said second information processing means is constructed to store said corrected information and thereafter to utilize the stored corrected information in communication between said first and second information processing means through said first information transmission means.

3. An adapter mountable at least on a lens barrel in a camera system including a camera body incorporating first information processing means and said lens barrel incorporating second information processing means and mountable on said camera body, wherein:
said adapter includes third information processing means;
said camera system includes first information transmission means provided between said camera body and said lens barrel for connecting said first and second information processing means and adapted to transmit at least a part of information specific to said lens barrel to said camera body, and second information transmission means provided between said lens barrel and said adapter for connecting said second and third information processing means; and said third information processing means is constructed to correct at least a part of information transmitted from said second information processing means through said second information transmission means, based on information specific to said adapter, and to transmit thus corrected information to said second information processing means through said second information transmission means.

4. A camera system comprising:

a camera body including a first information processing device;

a lens barrel including a second information processing device and mountable on said camera body;

an adapter including a third information processing device and mountable at least on said lens barrel;

a first information transmission device provided between said camera body and said lens barrel, which connects said first and second information processing devices, and which is adapted to transmit at least a part of information specific to said lens barrel to said camera body; and a second information transmission device provided between said lens barrel and said adapter, which connects said second and third information processing devices;

wherein said third information processing device is constructed to correct at least a part of information, transmitted from said second information processing device through said second information transmission device, based on information specific to said adapter, and to transmit said corrected information to said second information processing device through said second information transmission device.

5. The camera system according to claim 4, wherein said second information processing device is constructed to store said corrected information and thereafter to utilize the stored corrected information in communication between said first and second information processing devices through said first information transmission device.

6. An adapter mountable at least on a lens barrel in a camera system including a camera body incorporating a first information processing device and said lens barrel incorporating a second information processing device and mountable on said camera body, wherein:

said adapter includes a third information processing device;

said camera system includes a first information transmission device provided between said camera body and said lens barrel, which connects said first and second information processing devices and that is adapted to transmit at least a part of information specific to said lens barrel to said camera body, and a second information transmission device provided between said lens barrel and said adapter, which connects said second and third information processing devices; and said third information processing device is constructed to correct at least a part of information transmitted from said second information processing device through said second information transmission device, based on information specific to said adapter, and to transmit thus corrected information to said second information processing device through said second information transmission device.

* * * * *